(12) United States Patent
Noguchi (10) Patent No.: US 12,443,168 B2
(45) Date of Patent: Oct. 14, 2025

(54) SPEED ADJUSTMENT SUPPORT DEVICE

(71) Applicant: FANUC CORPORATION, Yamanashi (JP)

(72) Inventor: Yoshiaki Noguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 270 days.

(21) Appl. No.: 17/912,049

(22) PCT Filed: Mar. 16, 2021

(86) PCT No.: PCT/JP2021/010690
§ 371 (c)(1),
(2) Date: Sep. 16, 2022

(87) PCT Pub. No.: WO2021/187498
PCT Pub. Date: Sep. 23, 2021

(65) Prior Publication Data
US 2023/0138652 A1 May 4, 2023

(30) Foreign Application Priority Data
Mar. 18, 2020 (JP) ................................ 2020-047512

(51) Int. Cl.
*G05B 19/416* (2006.01)

(52) U.S. Cl.
CPC .. *G05B 19/416* (2013.01); *G05B 2219/41408* (2013.01)

(58) Field of Classification Search
CPC ........ G05B 19/416; G05B 2219/41408; G05B 2219/42166; G05B 2219/43065
See application file for complete search history.

(56) References Cited

U.S. PATENT DOCUMENTS

| | | | |
|---|---|---|---|
| 2010/0104388 A1* | 4/2010 | Suzuki | B23Q 17/0976 409/141 |
| 2012/0221141 A1* | 8/2012 | Otsuki | G05B 19/416 700/189 |
| 2013/0054175 A1* | 2/2013 | Saloio, Jr. | G01H 1/006 702/105 |

(Continued)

FOREIGN PATENT DOCUMENTS

| | | |
|---|---|---|
| CN | 101563661 A | 10/2012 |
| JP | H10268906 A | 10/1998 |

(Continued)

OTHER PUBLICATIONS

International Search Report in PCT/JP2021/010690, mailed May 11, 2021. 2pp.

*Primary Examiner* — Nicholas Klicos
(74) *Attorney, Agent, or Firm* — HAUPTMAN HAM, LLP (57) ABSTRACT

A speed adjustment support device calculates a jerk per unit time based on a difference in acceleration for each axis of an industrial machine between control cycles, compares the calculated jerk with an allowable jerk for each axis stored in advance, produces exceedance information including at least an exceeding state and an improvement means in a case of jerk exceedance as a result of the comparison, and supports work of adjusting a parameter related to speed of the industrial machine based on the exceedance information.

3 Claims, 10 Drawing Sheets

| | COMMAND TYPE | AXIS NAME | EXCEEDANCE PROPERTY | EXCEEDANCE AMOUNT | ADJUSTMENT TARGET |
|---|---|---|---|---|---|
| 1 | G00,G01 | X AXIS | JERK | 0 < EXCEEDANCE AMOUNT ≤ 10m/s³ | FILTER TIME CONSTANT (P.xxxx) ALLOWABLE ACCELERATION FOR X AXIS (P.yzyz) CORNER DECELERATION SPEED FOR X AXIS (P.zxzx) ... |
| 2 | G00,G01 | Y AXIS | JERK | 0 < EXCEEDANCE AMOUNT ≤ 10m/s³ | FILTER TIME CONSTANT (P.xxxx) ALLOWABLE ACCELERATION FOR Y AXIS (P.yyyy) CORNER DECELERATION SPEED FOR Y AXIS (P.zzzz) ... |
| 3 | G02,G03 | X AXIS Y AXIS Z AXIS | JERK | 0 < EXCEEDANCE AMOUNT ≤ 10m/s³ | DECELERATION SPEED SETTING PARAMETER (P.nn) MAXIMUM ACCELERATION SETTING PARAMETER (P.dd) ... |
| 4 | G01->G01 | X AXIS Y AXIS Z AXIS | JERK | 0 < EXCEEDANCE AMOUNT ≤ 10m/s³ | DECELERATION SPEED SETTING PARAMETER (P.oo) CORNER DECELERATION SPEED SETTING PARAMETER (P.oo2) MAXIMUM ACCELERATION SETTING PARAMETER (P.ee) ... |
| ... | ... | ... | ... | ... | ... |

(56) References Cited

U.S. PATENT DOCUMENTS

| | | | |
|---|---|---|---|
| 2014/0195037 A1* | 7/2014 | Nishibashi | G05B 19/40937 |
| | | | 700/188 |
| 2015/0366001 A1* | 12/2015 | Girardeau | H04W 84/18 |
| | | | 702/188 |
| 2018/0210417 A1 | 7/2018 | Okita et al. | |
| 2018/0217574 A1* | 8/2018 | Oonishi | G05B 19/27 |
| 2018/0275639 A1* | 9/2018 | Shinoda | B23Q 15/14 |
| 2018/0281184 A1* | 10/2018 | Kudo | B25J 13/088 |
| 2018/0307211 A1* | 10/2018 | Aizawa | G05B 13/0265 |
| 2019/0049939 A1* | 2/2019 | Kato | G05B 23/0205 |
| 2020/0257261 A1* | 8/2020 | Koshiishi | G06N 20/00 |
| 2021/0247734 A1* | 8/2021 | Sagasaki | G05B 13/0265 |

FOREIGN PATENT DOCUMENTS

| | | |
|---|---|---|
| JP | 2008-225825 A | 9/2008 |
| JP | 2018120431 A | 8/2018 |
| JP | 2018120543 A | 8/2018 |
| JP | 202035159 A | 3/2020 |
| WO | 2019130412 A1 | 7/2019 |

* cited by examiner

| | COMMAND TYPE | AXIS NAME | EXCEEDANCE PROPERTY | EXCEEDANCE AMOUNT | ADJUSTMENT TARGET |
|---|---|---|---|---|---|
| 1 | G00, G01 | X AXIS | JERK | 0 < EXCEEDANCE AMOUNT ≦ 10m/s$^3$ | FILTER TIME CONSTANT (P.xxxx) ALLOWABLE ACCELERATION FOR X AXIS (P.yzyz) CORNER DECELERATION SPEED FOR X AXIS (P.zxzx) ... |
| 2 | G00, G01 | Y AXIS | JERK | 0 < EXCEEDANCE AMOUNT ≦ 10m/s$^3$ | FILTER TIME CONSTANT (P.xxxx) ALLOWABLE ACCELERATION FOR Y AXIS (P.yyyy) CORNER DECELERATION SPEED FOR Y AXIS (P.zzzz) ... |
| 3 | G02, G03 | X AXIS Y AXIS Z AXIS | JERK | 0 < EXCEEDANCE AMOUNT ≦ 10m/s$^3$ | DECELERATION SPEED SETTING PARAMETER (P.nn) MAXIMUM ACCELERATION SETTING PARAMETER (P.dd) ... |
| 4 | G01->G01 | X AXIS Y AXIS Z AXIS | JERK | 0 < EXCEEDANCE AMOUNT ≦ 10m/s$^3$ | DECELERATION SPEED SETTING PARAMETER (P.oo) CORNER DECELERATION SPEED SETTING PARAMETER (P.oo2) MAXIMUM ACCELERATION SETTING PARAMETER (P.ee) ... |
| ... | ... | ... | ... | ... | ... |

| | COMMAND TYPE | AXIS NAME | EXCEEDANCE PROPERTY | EXCEEDANCE AMOUNT | ADJUSTMENT CONTENTS |
|---|---|---|---|---|---|
| 1 | G00,G01 | X AXIS | JERK | EXCEEDANCE AMOUNT = 9m/s$^3$ | REDUCE ALLOWABLE ACCELERATION FOR X AXIS BY 10 mm/s2 |
| 2 | G00,G01 | Y AXIS | JERK | EXCEEDANCE AMOUNT = 11m/s$^3$ | ADD 5s FILTER |
| ⋮ | ⋮ | ⋮ | ⋮ | ⋮ | ⋮ |

SPEED ADJUSTMENT SUPPORT DEVICE

RELATED APPLICATIONS

The present application is a National Phase of International Application No. PCT/JP2021/010690 filed Mar. 16, 2021, which claims priority to Japanese Application No. 2020-047512, filed Mar. 18, 2020.

TECHNICAL FIELD

The present invention relates to a speed adjustment support device and particularly relates to a speed adjustment support device for supporting speed adjustment with a machine lifetime taken into account.

BACKGROUND ART

Industrial machines are installed in a manufacturing premise such as a factory. In such a manufacturing premise, products are manufactured by operating industrial machines (for example, Patent Literature 1). As for operation of each industrial machine, it is required to reduce a time (cycle time) taken for manufacturing while maintaining processing accuracy. For example, when metal processing using a machine tool is performed, parameters of a controller, settings of a control program, and the like are manually or automatically adjusted to achieve processing accuracy within a dimension tolerance and shorten a cycle time.

When a setting of the controller is adjusted, it is necessary to operate movable portions of each industrial machine in ranges of speed and acceleration which is the changing rate of the speed, which are allowed for the industrial machine. This is because, when adjusted acceleration is too high, shock may occur during operation of the industrial machine and cause excessive abrasion or damage to the movable portions of the industrial machine, components attached to the movable portions, or the like. In addition, when jerk as the changing rate of acceleration is too high, shock may occur to the industrial machine and potentially shorten the life of the industrial machine.

CITATION LIST

Patent Literature

Patent Literature 1

Japanese Patent Laid-Open No. 2018-120431

SUMMARY OF INVENTION

Technical Problem

In order to make an adjustment for controlling jerk to be kept within an allowed tolerance, it is necessary for an operator to know a value of the jerk that is output during control. Thus, temporal transition of speed, temporal transition of acceleration, and temporal transition of jerk need to be sequentially calculated in the stated order by repeatedly performing, for example, differential calculation based on temporal transition of the position of the movable portion, which is acquired from the industrial machine. Such calculation at stages increases cost of calculation at a CPU and requires large storage capacity. Thus, it is difficult to additionally perform jerk calculation at, for example, a controller that performs processing necessary for controlling operation of the industrial machine, such as program analysis processing and moving amount interpolation processing, or a simulation device that performs simulation processing requiring a significantly large amount of calculation. For this reason, processing such as determination related to jerk has not been sufficiently performed during machining nor simulation, and accordingly, when the occurrence of jerk exceedance is detected, sufficient support has not been provided to notify an operator of the kind of a situation in which the jerk exceedance has occurred and the kind of adjustment needed to improve the jerk exceedance.

Thus, such a technology has been required that calculates jerk with limited calculation resources and supports parameter adjustment related to control based on the calculated jerk.

Solution to Problem

A speed adjustment support device according to an aspect of the present invention solves the above-described problem by calculating a jerk per unit time as the difference between accelerations that are output in respective control cycles and supporting parameter adjustment related to speed control by using the calculated jerk.

The aspect of the present invention is a speed adjustment support device that analyzes a control program for controlling an industrial machine and supports parameter adjustment so that a value related to speed falls within an allowable value range set in advance. The speed adjustment support device includes a jerk calculation unit configured to calculate a jerk per unit time based on a difference in acceleration for each axis of the industrial machine between control cycles, a jerk comparison unit configured to compare the jerk calculated by the jerk calculation unit with an allowable jerk for each axis stored in advance, and an exceedance information production unit configured to produce exceedance information including at least an exceeding state and an improvement means in a case of jerk exceedance as a result of the comparison by the jerk comparison unit. The speed adjustment support device supports work of adjusting a parameter related to speed of the industrial machine based on the exceedance information.

Advantageous Effect of Invention

According to an aspect of the present invention, it is possible to prevent the jerk from exceeding an allowable limit in mass production by notifying an operator of exceedance of an allowable jerk to make it easy to change the setting of the numerical controller.

DESCRIPTION OF EMBODIMENTS

Embodiments of the present invention will now be described with reference to the attached drawings.

Figure 1:
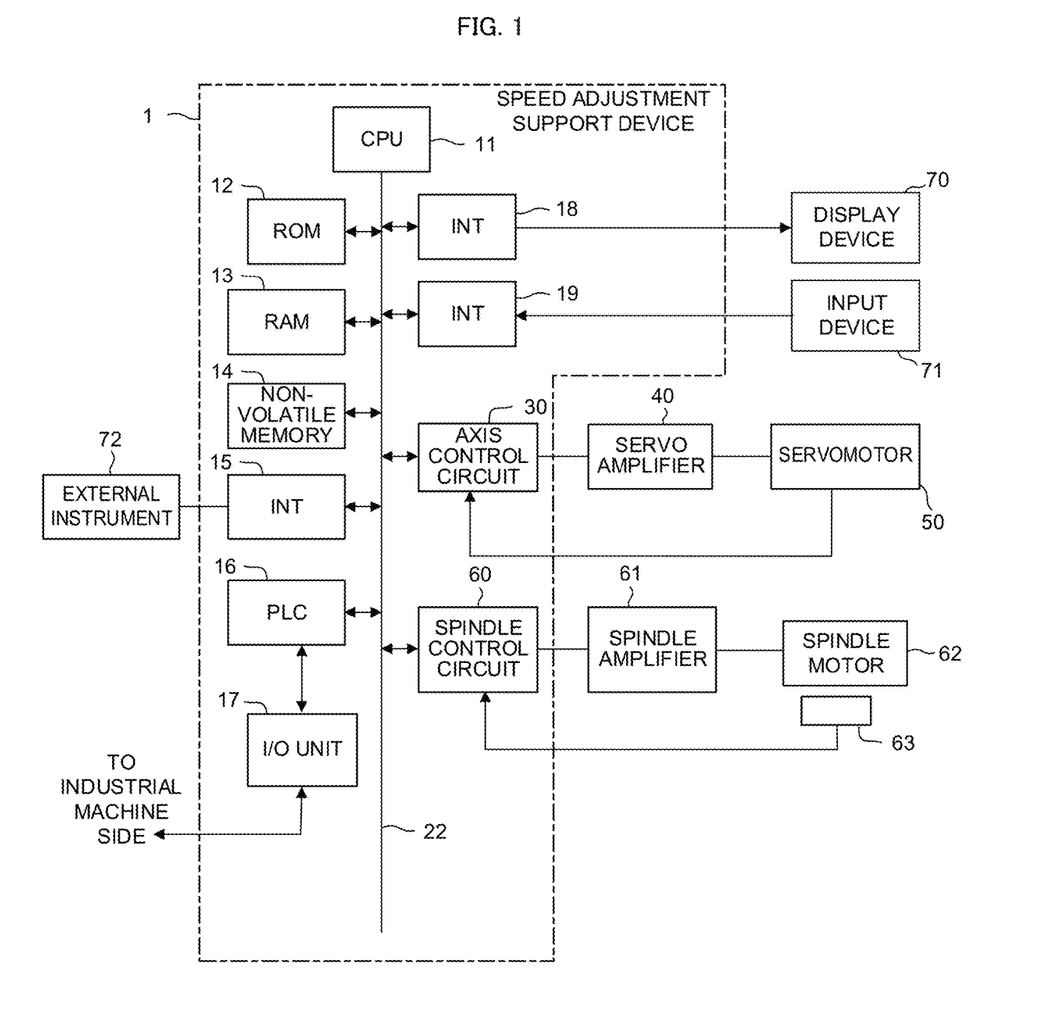
FIG. 1 is a schematic hardware configuration diagram of a speed adjustment support device according to a first embodiment.

FIG. 1 is a schematic hardware configuration diagram illustrating a main part of a speed adjustment support device according to a first embodiment of the present invention. A speed adjustment support device 1 of the present invention may be implemented on, for example, a controller configured to control an industrial machine. Alternatively, the speed adjustment support device 1 of the present invention may be implemented on, for example, a personal computer, a fog computer, a cloud server, or the like connected through a wired/wireless network to the controller configured to control an industrial machine. The present embodiment will be described with an example in which the speed adjustment support device 1 is implemented on a controller configured to control an industrial machine.

A CPU 11 included in the speed adjustment support device 1 of the present invention is a processor configured to comprehensively control the speed adjustment support device 1. The CPU 11 reads a system program stored in a ROM 12 through a bus 22 and controls the entire speed adjustment support device 1 in accordance with the system program. A RAM 13 temporarily stores temporary calculation data and display data, various kinds of data input from outside, and the like.

A non-volatile memory 14 is configured as, for example, a memory backed up with a non-illustrated battery or a solid-state drive (SSD) and maintains a storage state even when the speed adjustment support device 1 is powered off. The non-volatile memory 14 stores, for example, data and control programs read from an external instrument 72 through an interface 15, data and control programs input through an input device 71, and data acquired from an industrial machine. The data and control programs stored in the non-volatile memory 14 may be loaded onto the RAM 13 when executed/used. In addition, various system programs such as a well-known analysis program are written to the ROM 12 in advance.

The interface 15 is an interface for connecting the CPU 11 of the speed adjustment support device 1 to the external instrument 72 such as a USB device. Control programs, parameters, and the like used to control an industrial machine can be read from the external instrument 72 side. Control programs, parameters, and the like edited in the speed adjustment support device 1 may be stored in an external storage means (not illustrated) through the external instrument 72. By using a sequence program contained in the speed adjustment support device 1, a programmable logic controller (PLC) 16 outputs signals to an industrial machine and a peripheral device (for example, a tool replacement device, an actuator of a robot or the like, or a sensor attached to the industrial machine) of the industrial machine through an I/O unit 17 to control them.

In addition, the PLC 16 receives signals from various switches of an operation board provided in a body of the industrial machine, the peripheral device, and the like, provides necessary signal processing to the signals, and then passes the signals to the CPU 11.

Data and the like obtained as a result of execution of data, control programs, system programs, and the like read onto the memory are output to a display device 70 through an interface 18 and displayed thereon. The input device 71 configured as a keyboard, a pointing device, or the like passes command data or the like based on an operation by a worker to the CPU 11 through an interface 19.

An axis control circuit 30 for controlling an axis of the industrial machine receives an axis movement command amount from the CPU 11 and outputs an axis command to a servo amplifier 40. The servo amplifier 40 receives the command and drives a servomotor 50 configured to move the axis of the industrial machine. The servomotor 50 for the axis includes a position detector and a speed detector, feeds a position feedback signal and a speed feedback signal from the position detector and the speed detector back to the axis control circuit 30, and performs position feedback control and speed feedback control.

Note that the hardware configuration diagram of FIG. 1 illustrates only one axis control circuit 30, one servo amplifier 40, and one servomotor 50, but in reality, these components are prepared in numbers equal to the number of axes of a control target industrial machine. For example, three sets of the axis control circuit 30, the servo amplifier 40, and the servomotor 50 configured to relatively move a spindle to which a tool is attached and a workpiece in the directions of three linear axes (X axis, Y axis, and Z axis) are prepared when a typical working machine is to be controlled.

A spindle control circuit 60 receives a spindle rotation command and outputs a spindle speed signal to a spindle amplifier 61. The spindle amplifier 61 receives the spindle speed signal and drives the tool by rotating a spindle motor 62 of the industrial machine at a commanded rotational speed. A position coder 63 is connected to the spindle motor 62 and outputs a feedback pulse in synchronization with the rotation of the spindle, and the feedback pulse is read by the CPU 11.

Figure 2:
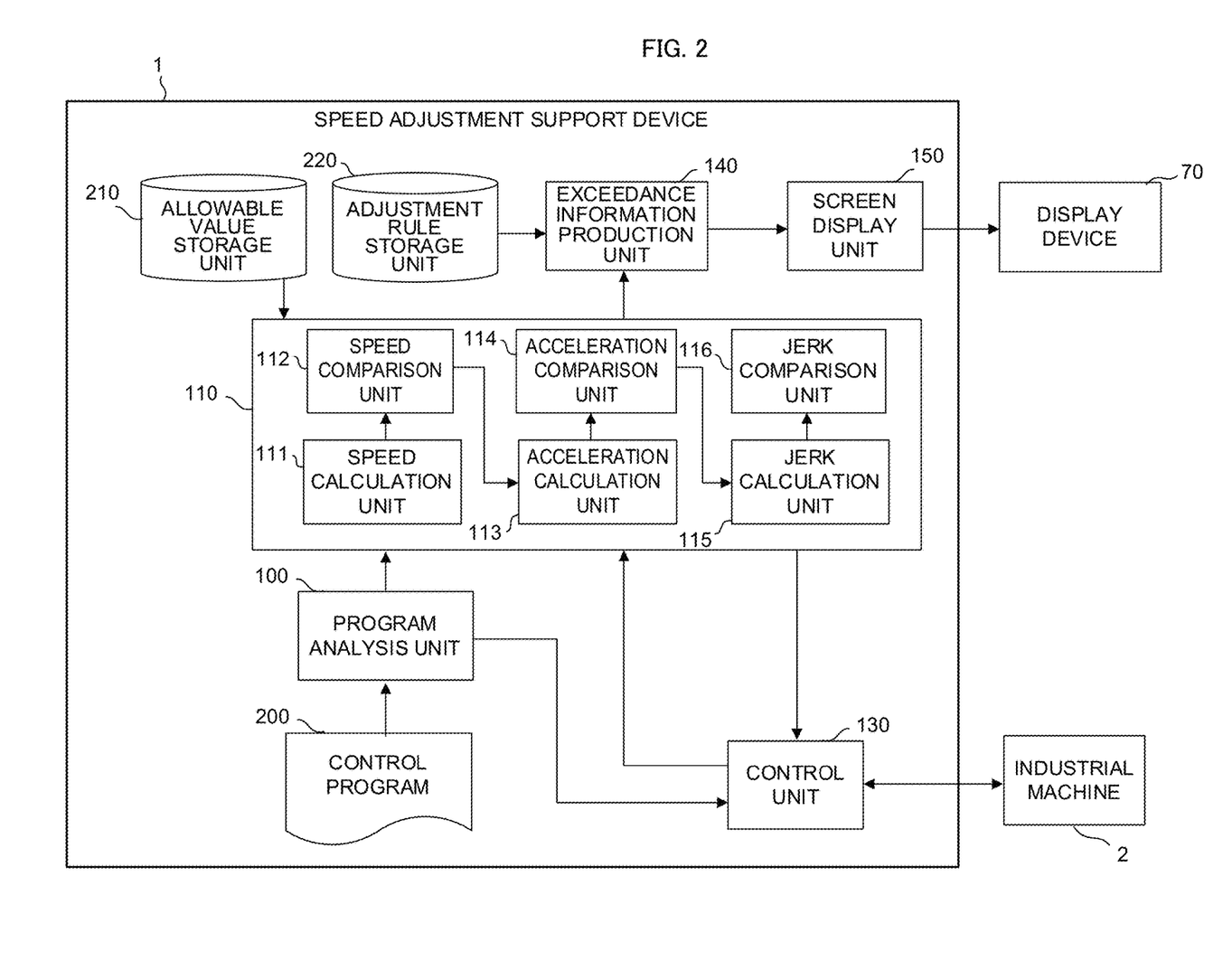
FIG. 2 is a schematic functional block diagram of the speed adjustment support device according to the first embodiment.

FIG. 2 is a schematic block diagram illustrating functions of the speed adjustment support device 1 according to the first embodiment of the present invention. Each function of the speed adjustment support device 1 according to the present embodiment is implemented when the CPU 11 included in the speed adjustment support device 1 illustrated in FIG. 1 executes a system program and controls operation of each component of the speed adjustment support device 1.

The speed adjustment support device 1 of the present embodiment includes a program analysis unit 100, a feed speed calculation unit 110, a control unit 130, an exceedance information production unit 140, and a screen display unit 150. A control program 200 acquired from the input device 71, the external instrument 72, or the like is stored in the RAM 13 or the non-volatile memory 14 of the speed adjustment support device 1 in advance. In addition, an allowable value storage unit 210 that is a region in which value tolerated in speed, acceleration, jerk for each axis of an industrial machine 2 as a control target are stored in advance is prepared in the RAM 13 or the non-volatile memory 14 of the speed adjustment support device 1 in advance. Furthermore, an adjustment rule storage unit 220 that is a region in which a parameter adjustment rule is stored in advance is prepared in the RAM 13 or the non-volatile memory 14 of the speed adjustment support device 1 in advance.

The program analysis unit 100 is implemented when the CPU 11 included in the speed adjustment support device 1 illustrated in FIG. 1 executes a system program read from the ROM 12 and arithmetic processing using the RAM 13 and the non-volatile memory 14 is performed mainly by the CPU 11. The program analysis unit 100 sequentially reads a block of operation commands for the industrial machine 2 from the control program 200 and analyzes the operation commands. Then, the program analysis unit 100 produces, based on a result of the analysis, command data that commands operation of the servomotor 50 and the spindle motor 62 included in the industrial machine 2. The program analysis unit 100 outputs command data related to a feed command among the produced command data to the feed speed calculation unit 110 and outputs the remaining command data to the control unit 130, the feed command commanding operation of the servomotor 50 configured to move a movable portion of the industrial machine 2.

The feed speed calculation unit 110 is implemented when the CPU 11 included in the speed adjustment support device 1 illustrated in FIG. 1 executes a system program read from the ROM 12 and arithmetic processing using the RAM 13 and the non-volatile memory 14 is performed mainly by the CPU 11. The feed speed calculation unit 110 calculates the speed, acceleration, and jerk for each axis of the industrial machine 2 in the current control cycle based on command data input from the program analysis unit 100. Then, the feed speed calculation unit 110 compares the calculated speed, acceleration, and jerk with the allowable value of speed, acceleration, and jerk of the industrial machine 2, respectively, which are stored in the allowable value storage unit 210 in advance. When the speed, the acceleration, or the jerk in the current control cycle exceeds its allowable value, the feed speed calculation unit 110 outputs, to the exceedance information production unit 140, comparison result information including the amounts of exceedance and a block of operation commands corresponding to the exceedance in the control program 200. In addition, the feed speed calculation unit 110 outputs the calculation results of speed, acceleration, and jerk to the control unit 130.

The feed speed calculation unit 110 includes a speed calculation unit 111, a speed comparison unit 112, an acceleration calculation unit 113, an acceleration comparison unit 114, a jerk calculation unit 115, and a jerk comparison unit 116.

The speed calculation unit 111 calculates the speed for each axis of the industrial machine 2 in the current control cycle based on command data input from the program analysis unit 100. The speed calculation unit 111 may calculate the speed for each axis in the current control cycle based on, for example, a feed speed commanded by the command data.

The speed comparison unit 112 compares the speed for each axis in the current control cycle, which is calculated by the speed calculation unit 111 with an allowable speed for the axis of the industrial machine 2, which is stored in the allowable value storage unit 210 in advance. When the speed for any axis in the current control cycle, which is calculated by the speed calculation unit 111, exceeds the allowable value, the speed comparison unit 112 may perform speed adjustment such as by clamping at the allowable value. Alternatively, when the speed for any axis exceeds the allowable value, the speed comparison unit 112 may perform no speed adjustment and output a notice of the exceedance to the exceedance information production unit 140.

The acceleration calculation unit 113 calculates the acceleration for each axis of the industrial machine 2 in the current control cycle based on the speed for each axis, which is output from the speed comparison unit 112. The acceleration calculation unit 113 may calculate the acceleration for each axis in the current control cycle by, for example, calculating the difference between the speed for the axis, which is output from the speed comparison unit 112 and the speed for the axis in the previous control cycle. Alternatively, the acceleration calculation unit 113 may calculate the acceleration for each axis in the current control cycle by, for example, calculating the difference between the speed for the axis, which is output from the speed comparison unit 112 and the speed for the axis in the previous control cycle, which is fed back from the industrial machine 2.

The acceleration comparison unit 114 compares the acceleration for each axis in the current control cycle, which is calculated by the acceleration calculation unit 113 with an allowable acceleration for the axis of the industrial machine 2, which is stored in the allowable value storage unit 210 in advance. When the acceleration for any axis in the current control cycle, which is calculated by the acceleration calculation unit 113 exceeds the allowable value, the acceleration comparison unit 114 may perform speed adjustment such as by clamping at the allowable value. Alternatively, when the acceleration for any axis exceeds the allowable value, the acceleration comparison unit 114 may perform no acceleration adjustment and output a notice of the exceedance to the exceedance information production unit 140.

The jerk calculation unit 115 calculates the jerk for each axis of the industrial machine 2 in the current control cycle based on the acceleration for the axis, which is output from the acceleration comparison unit 114. The jerk calculation unit 115 may calculate the jerk for each axis in the current control cycle by, for example, calculating the difference between the acceleration for each axis, which is output from the acceleration comparison unit 114 and the acceleration for each axis in the previous control cycle. Alternatively, the jerk calculation unit 115 may calculate the jerk for each axis in the current control cycle by, for example, calculating the difference between the speed for each axis, which is output from the acceleration comparison unit 114 and the acceleration for each axis in the previous control cycle, which is fed back from the industrial machine 2.

The jerk comparison unit 116 compares the jerk for each axis in the current control cycle, which is calculated by the jerk calculation unit 115 with an allowable jerk for each axis of the industrial machine 2, which is stored in the allowable value storage unit 210 in advance. When the jerk for any axis in the current control cycle, which is calculated by the jerk calculation unit 115 exceeds the allowable value, the jerk comparison unit 116 outputs a notice of the exceedance to the exceedance information production unit 140.

The control unit 130 is implemented when the CPU 11 included in the speed adjustment support device 1 illustrated in FIG. 1 executes a system program read from the ROM 12, arithmetic processing using the RAM 13 and the non-volatile memory 14 is performed mainly by the CPU 11, and control processing of each component of the industrial machine 2 by using the axis control circuit 30, the spindle control circuit 60, and the PLC 16 is performed. The control unit 130 controls each component of the industrial machine 2 based on command data analyzed by the program analysis unit 100 and the feed speed for each axis of the industrial machine 2, which is calculated by the feed speed calculation unit 110. The control unit 130 generates data related to axis movement based on, for example, a command that moves each axis of the industrial machine 2, and outputs the data to the servomotor 50. In addition, the control unit 130 generates data related to rotation of a spindle of the industrial machine 2 based on, for example, a command that rotates the spindle, and outputs the data to the spindle motor 62. Furthermore, the control unit 130 generates a predetermined signal that operates a peripheral device of the industrial machine 2 based on, for example, a command that operates the peripheral device, and outputs the signal to the PLC 16. The control unit 130 acquires states of the servomotor 50 and the spindle motor 62 (current value, position, speed, acceleration, torque, or the like of each motor) as feedback values and uses the feedback values for each control processing. The control unit 130 may output the speed or acceleration of the servomotor 50 to the feed speed calculation unit 110.

The exceedance information production unit 140 is implemented when the CPU 11 included in the speed adjustment support device 1 illustrated in FIG. 1 executes a system program read from the ROM 12 and arithmetic processing using the RAM 13 and the non-volatile memory 14 is performed mainly by the CPU 11. The exceedance information production unit 140 produces exceedance information to be displayed to an operator based on the comparison result information input from the feed speed calculation unit 110. The exceedance information production unit 140 produces, as exceedance information, screen data for notifying the operator of a block corresponding to the exceedance in the control program 200, an exceedance amount, a solution, and the like. The exceedance information production unit 140 may identify an adjustment target parameter based on, for example, the comparison result information and an adjustment rule stored in the adjustment rule storage unit 220 and produce exceedance information including the identified parameter as an improvement means.

Figure 3:
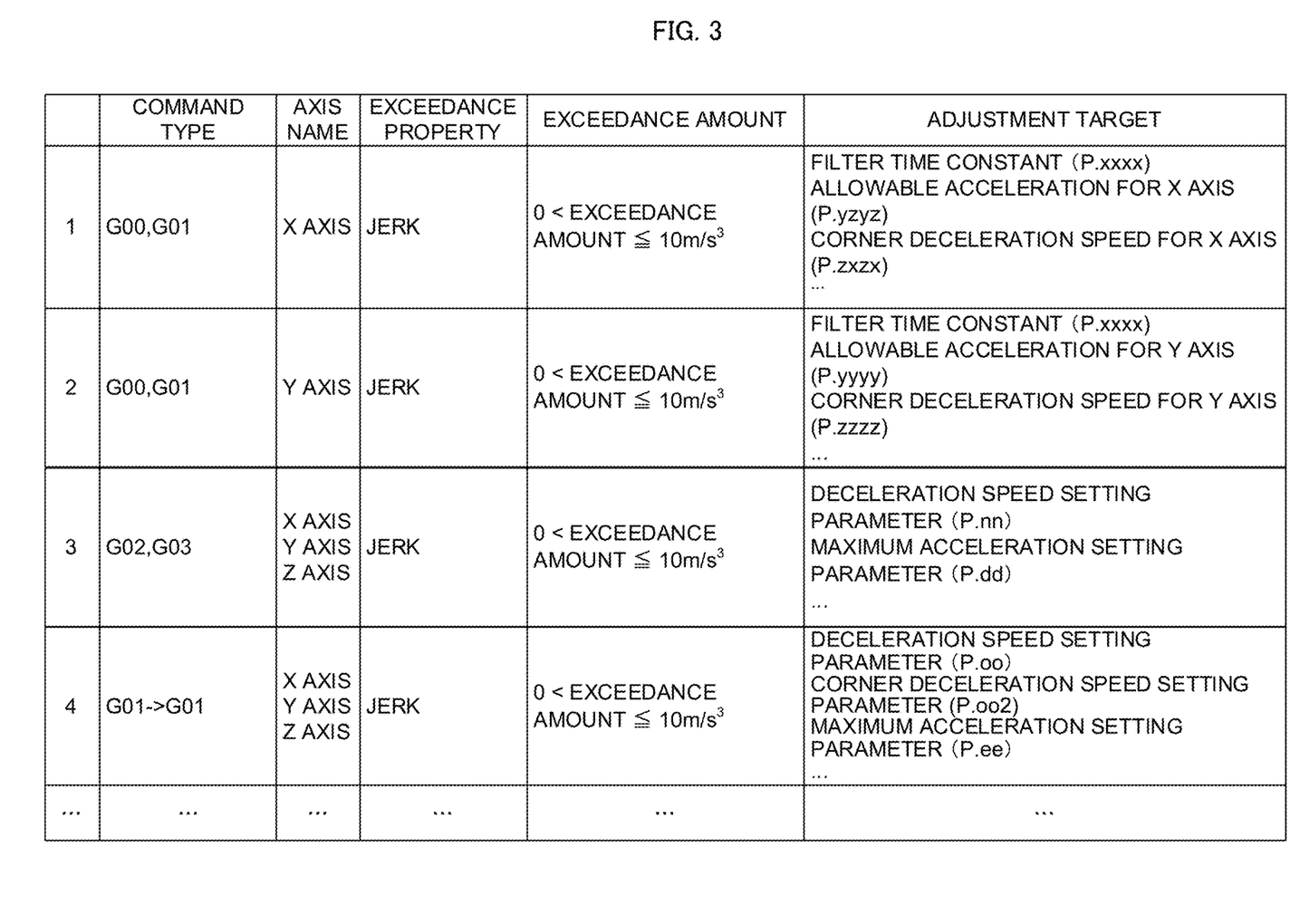
FIG. 3 is a diagram illustrating exemplary adjustment rules.

FIG. 3 illustrates exemplary adjustment rules stored in the adjustment rule storage unit 220. Each adjustment rule may be defined as, for example, data in which adjustment target parameter is associated with a command type, an exceedance axis name (single axis or a plurality of axes), an exceedance property (speed, acceleration, or jerk), and an exceedance amount. The exceedance information production unit 140 identifies a command type, an exceedance axis name, an exceedance property (speed, acceleration, or jerk), and an exceedance amount based on the comparison result information, searches the adjustment rule storage unit 220 for an adjustment rule corresponding to the identified values, and produces exceedance information including, as an improvement means, adjustment target parameters included in the searched adjustment rule. The command type may be designated with a single command (such as G00 or G01) or may be designated with two or more continuous commands (such as G01→G01). When the command type is designated with two or more continuous commands (such as G01→G01), a condition such as the angle between moving directions based on the respective commands may be designated.

In each adjustment rule, appropriate adjustment targets and adjustment contents can be set in accordance with a command type, an exceedance property, an exceedance amount, and the like. For example, when jerk exceedance occurs at a circular part (such as G02 or G03) or corner part of a program, the jerk can be reduced by increasing a filter time constant but path error increases in a trade-off manner. An effect of change of the above-described filter time constant occurs to the entire program, and thus when a jerk exceedance part is limited to a certain part, a method of performing correction with limitation to the part is desirable. The method may use a parameter that sets a deceleration speed at the corner part or a maximum acceleration in circular interpolation. The angle or curvature radius of the moving direction (vector) of the tool before and after a jerk exceedance part (program part) is calculated, whether an exceedance part has a corner shape or a circular shape is determined based on the magnitude of the calculated value, and in such a case, adjustment of the above-described deceleration speed setting parameter or maximum acceleration setting parameter at the corner part is prompted to advise the operator to limit influence to a particular place (rules 3 and 4 in FIG. 3).

In another exemplary adjustment rule, conditions of a adjustment rule may include conditions such as the kind and scale of a machine. A workpiece processed by a large-sized machine has a large size and thus has a large workpiece weight. Accordingly, a large filter time constant is often initially set to such a machine to achieve gradual acceleration, and in such a case, when a larger filter time constant is set for jerk adjustment, deviation from a path designated by a program increases and potentially becomes out of processing tolerance. Thus, when an axis stroke (fabrication range) set at the controller is larger than a certain constant value (large processing is performed), not only correction of the filter time constant but also program readjustment such as reduction of a command speed at a program part of the program at which jerk exceedance has occurred (for example, reduction of the command speed to improve jerk exceedance and prevent path deviation) are proposed as adjustment targets.

As described above, each adjustment rule is desirably produced in advance in accordance with a condition that jerk exceedance occurs, so that appropriate proposal is provided in accordance with a situation in which the condition occurs.

The screen display unit 150 is implemented when the CPU 11 included in the speed adjustment support device 1 illustrated in FIG. 1 executes a system program read from the ROM 12, arithmetic processing using the RAM 13 and the non-volatile memory 14 is performed mainly by the CPU 11, and output processing using the interface 18 is performed. The screen display unit 150 produces screen data for displaying exceedance information produced by the exceedance information production unit 140. Then, the screen display unit 150 displays the produced screen data on the display device 70.

An Example of the operation of the speed adjustment support device 1 according to the present embodiment will be described with reference to FIGS. 4 and 5. In this example of the operation, the adjustment rules illustrated in FIG. 3 are stored in the adjustment rule storage unit 220. The allowable speed, allowable acceleration, and allowable jerk for each axis of the industrial machine 2 as control targets are 100 mm/s, 40 mm/s$^2$, and 50 m/s$^3$, respectively. The control cycle is set to 1 msec.

Figure 4:
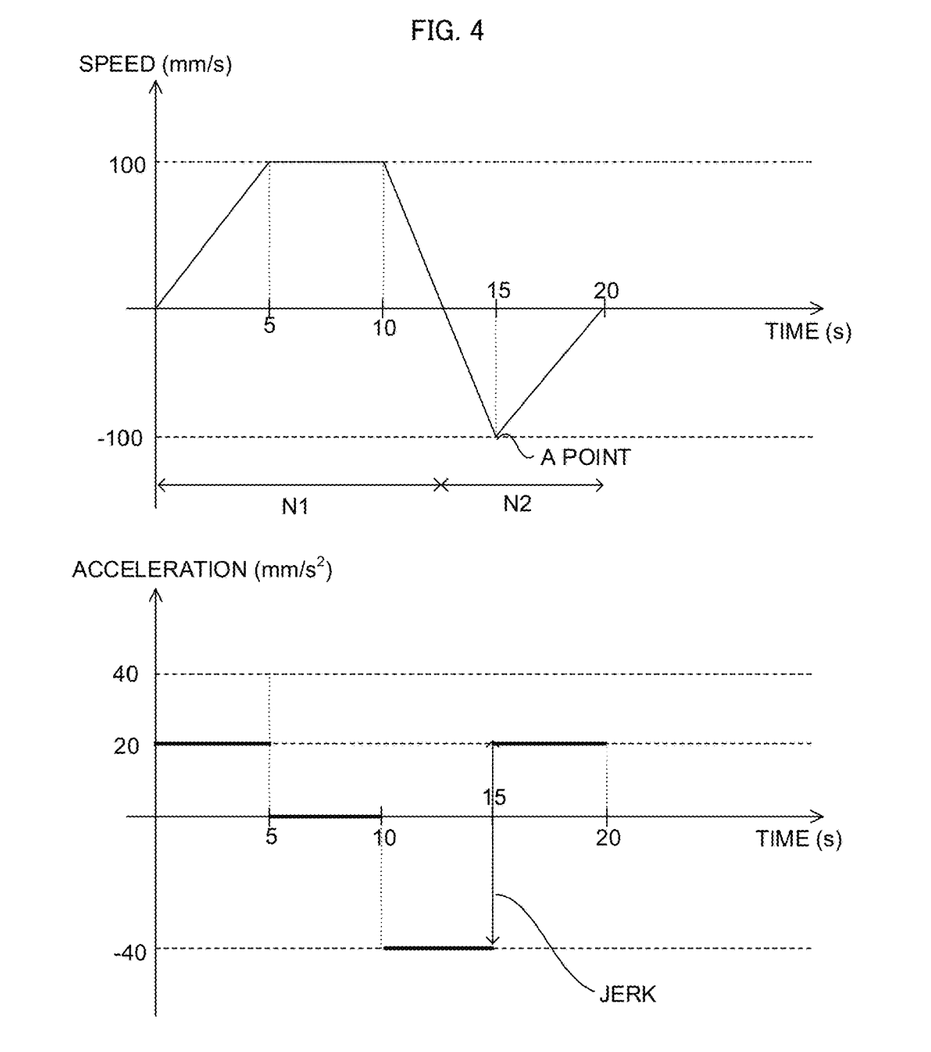
FIG. 4 is a diagram illustrating exemplary operation of an industrial machine when a jerk exceeds an allowable value.
Figure 5:
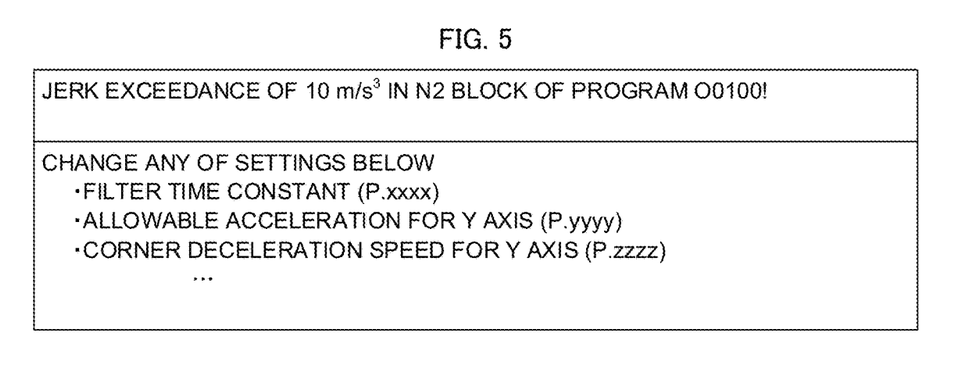
FIG. 5 is a diagram illustrating exemplary display of exceedance information.

FIG. 4 illustrates graphs of change in the speed and acceleration for a Y axis during control of the industrial machine 2 by a predetermined control program. In an example illustrated in FIG. 4, the upper graph illustrates the speed change for the Y axis, and the lower graph illustrates the acceleration change for the Y axis. In each graph, 0 to 12.5 seconds correspond to speed and acceleration change due to commands of an N1 block, and 12.5 to 20 seconds correspond to speed and acceleration change due to commands of an N2 block. The speed and acceleration during execution of the N1 and N2 blocks change in respective allowable value ranges. However, abrupt acceleration change occurs at a point A (near 15 seconds) during execution of the N2 block. The jerk calculation unit 115 calculates the jerk at the point A to be $(20+40)/0.001=60$ m/s$^3$. The jerk comparison unit 116 compares the calculated value with the allowable jerk of 50 m/s$^3$, determines that the jerk exceeds the allowable jerk by 10 m/s$^3$ in the N2 block, and outputs comparison result information including information of the block in which the exceedance has occurred (information of the N2 block), the exceedance axis name, the exceedance property (jerk), and the exceedance amount to the exceedance information production unit 140.

Having received the comparison result information, the exceedance information production unit 140 searches the adjustment rule storage unit 220 by using each value included in the comparison result information. Then, the second adjustment rule illustrated in FIG. 3 is searched as a search result. The exceedance information production unit 140 produces exceedance information including parameters included in the searched adjustment rule. The produced exceedance information is output to the screen display unit 150. Then, the screen display unit 150 displays information exemplarily illustrated in FIG. 5 on the display device 70.

Figure 6:
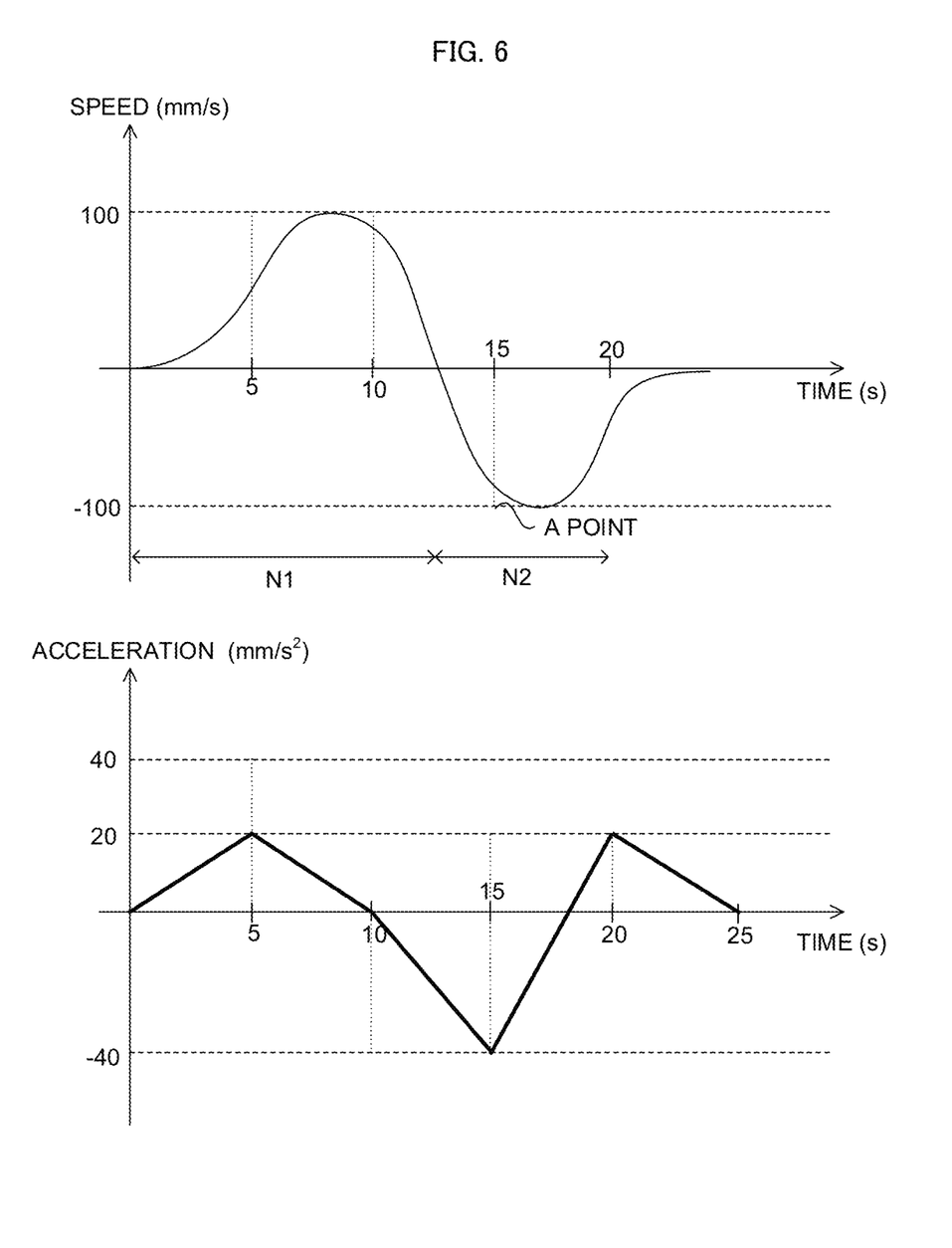
FIG. 6 is a diagram illustrating exemplary operation of the industrial machine after parameter adjustment.

Speed and acceleration change as exemplarily illustrated in graphs in FIG. 6 when an operator having viewed the display performs, for example, adjustment of setting a 5 s filter. In the example illustrated in FIG. 6, the jerk has a maximum value of 12 m/s$^3$, which is within the allowable jerk.

The speed adjustment support device 1 according to the present embodiment, which has the above-described configuration, can easily perform jerk calculation by only performing acceleration difference extraction and comparison processing with an allowable value and thus can easily support parameter adjustment related to speed control even in an environment in which calculation resources are limited.

Figure 7:
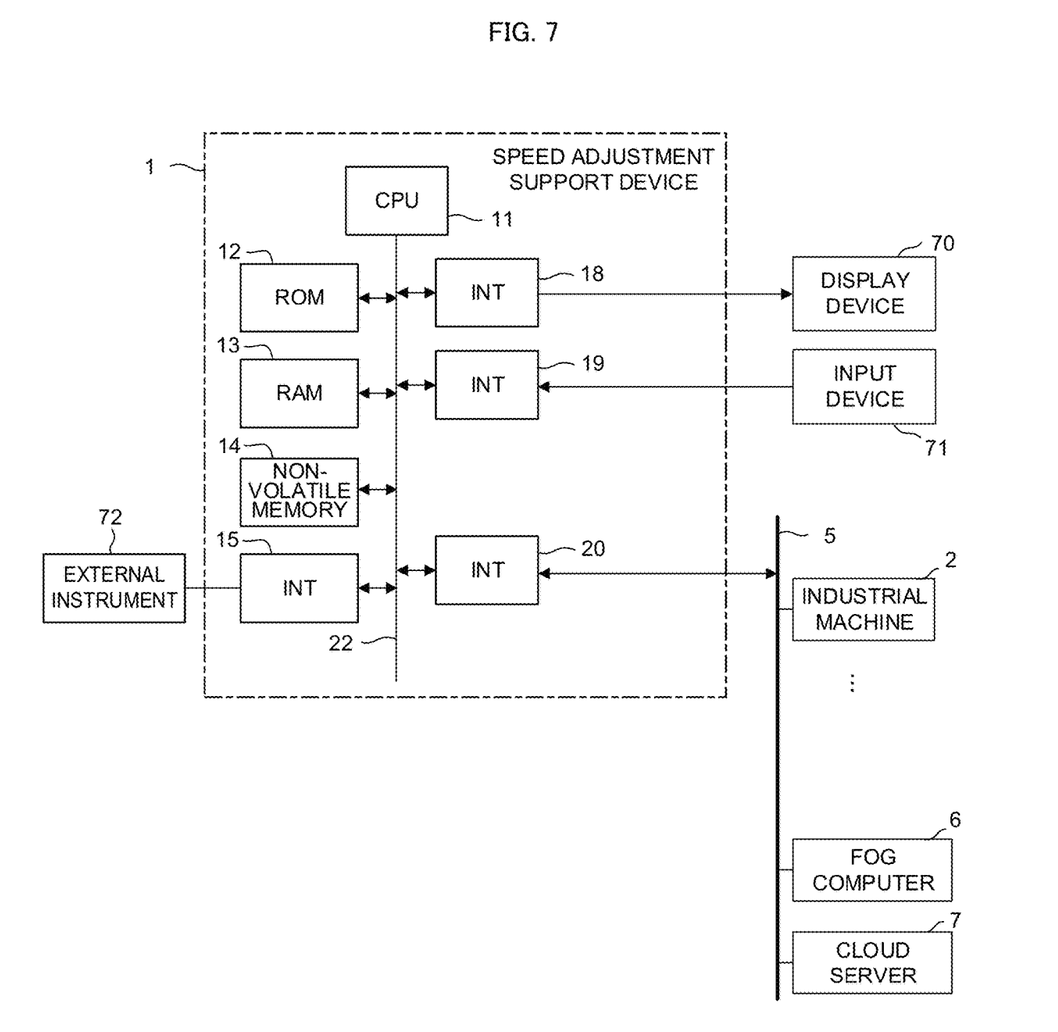
FIG. 7 is a schematic hardware configuration diagram of a speed adjustment support device according to a second embodiment.

FIG. 7 is a schematic hardware configuration diagram illustrating a main part of a speed adjustment support device according to a second embodiment of the present invention. The speed adjustment support device 1 of the present invention is, for example, implemented on a computer connected to the industrial machine 2 through a network.

The components such as the CPU 11, the ROM 12, the RAM 13, the non-volatile memory 14, and the interfaces 15, 18, and 19 included in the speed adjustment support device 1 according to the present embodiment have the same functions of components described in the first embodiment.

An interface 20 is an interface for connecting the CPU 11 of the speed adjustment support device 1 to a wired or wireless network 5. The industrial machine 2, a fog computer 6, a cloud server 7, and the like are connected to the network 5 and perform mutual data communication.

Figure 8:
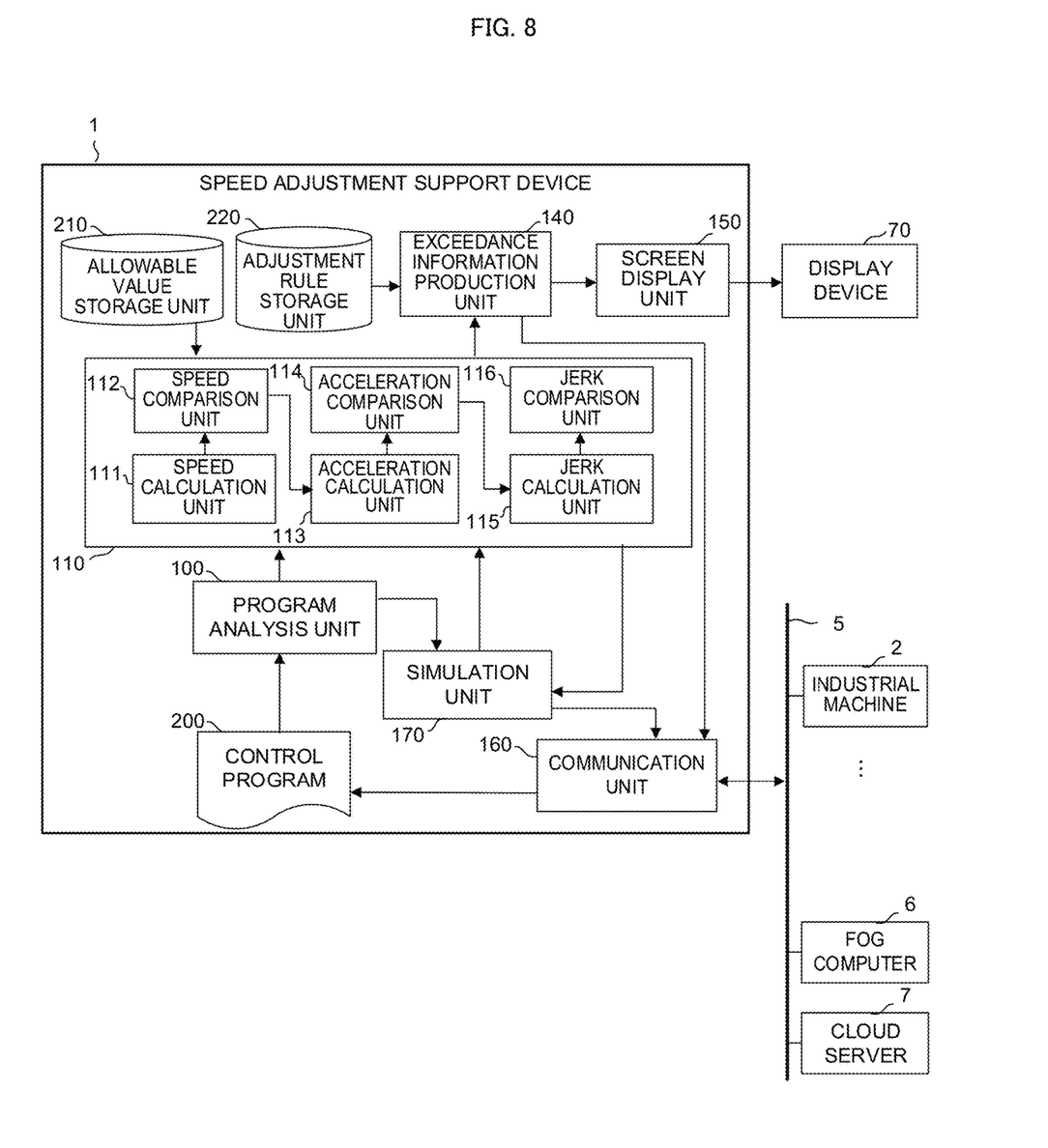
FIG. 8 is a schematic functional block diagram of the speed adjustment support device according to the second embodiment.

FIG. 8 is a schematic block diagram illustrating functions of the speed adjustment support device 1 according to the second embodiment of the present invention. Each function of the speed adjustment support device 1 according to the present embodiment is implemented when the CPU 11 included in the speed adjustment support device 1 illustrated in FIG. 7 executes a system program and controls operation of each component of the speed adjustment support device 1.

The speed adjustment support device 1 of the present embodiment includes the program analysis unit 100, the feed speed calculation unit 110, the exceedance information production unit 140, the screen display unit 150, a communication unit 160, and a simulation unit 170. A region for storing the control program 200 acquired from the industrial machine 2 through the network 5 is provided in the RAM 13 or the non-volatile memory 14 of the speed adjustment support device 1. In addition, the allowable value storage unit 210 that is a region in which a speed allowable value, an acceleration allowable value, a jerk allowable value, and the like allowed for each axis of the industrial machine 2 as a control target are stored in advance is prepared in the RAM 13 or the non-volatile memory 14 of the speed adjustment support device 1 in advance. Furthermore, the adjustment rule storage unit 220 that is a region in which a parameter adjustment rule is stored in advance is prepared in the RAM 13 or the non-volatile memory 14 of the speed adjustment support device 1 in advance.

Functions of the program analysis unit 100, the feed speed calculation unit 110, and the exceedance information production unit 140 according to the present embodiment are the same as the respective functions according to the first embodiment except that data is communicated with the simulation unit 170 in place of the control unit 130.

The communication unit 160 is implemented when the CPU 11 included in the speed adjustment support device 1 illustrated in FIG. 7 executes a system program read from the ROM 12, arithmetic processing using the RAM 13 and the non-volatile memory 14 is performed mainly by the CPU 11, and input-output processing using the interface 20 is performed. The communication unit 160 transmits and receives data to and from the industrial machine 2, the fog computer 6, and the cloud server 7 through the network 5. The communication unit 160 receives the control program 200 from, for example, the industrial machine 2. In addition, the communication unit 160 transmits exceedance information produced by the exceedance information production unit 140 to the industrial machine 2, the fog computer 6, the cloud server, and the like.

The simulation unit 170 is implemented when the CPU 11 included in the speed adjustment support device 1 illustrated in FIG. 7 executes a system program read from the ROM 12 and arithmetic processing using the RAM 13 and the non-volatile memory 14 is performed mainly by the CPU 11. The simulation unit 170 simulates control operation of the industrial machine 2 based on the control program 200. Information on axis movement of the industrial machine 2, which is obtained by the simulation unit 170 is output as feedback data to the feed speed calculation unit 110. A result of the simulation by the simulation unit 170 may be output as display on the display device 70 by the screen display unit 150. The result of the simulation by the simulation unit 170 may be transmitted to the industrial machine 2, the fog computer 6, the cloud server 7, and the like by the communication unit 160.

The speed adjustment support device 1 according to the present embodiment, which has the above-described configuration executes simulation processing based on the control program 200 acquired from the industrial machine 2 through the network 5 and calculates a speed, an acceleration, and a jerk. When the speed, the acceleration, or the jerk exceeds its allowable value, information on parameter adjustment related to speed control can be displayed on the display device 70 or notified to an operator of the industrial machine 2. In addition, the information on parameter adjustment related to speed control can be transmitted to the fog computer 6 or the cloud server 7, accumulated, and used for analysis processing or the like.

Figure 9:
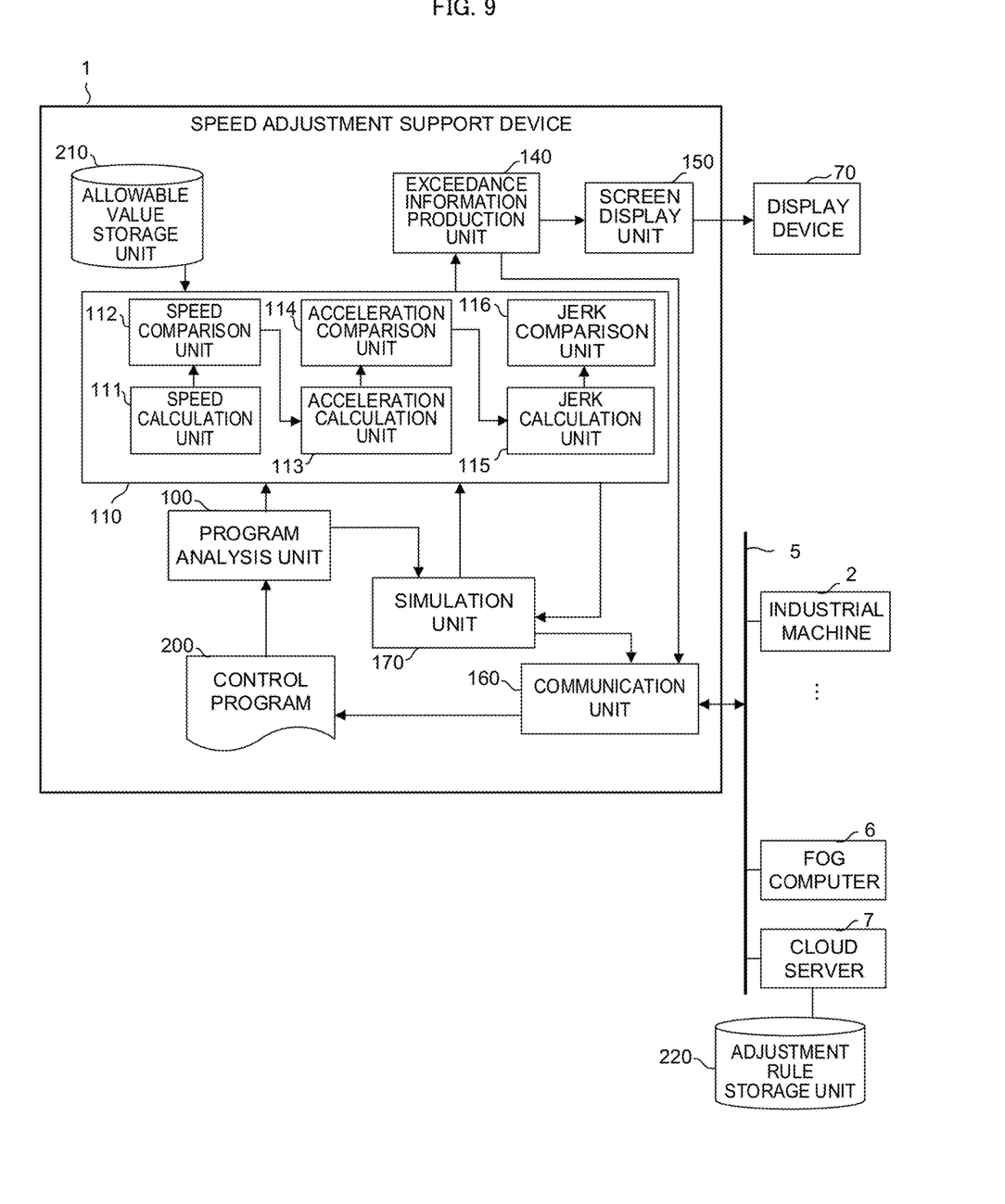
FIG. 9 is a schematic functional block diagram of a speed adjustment support device according to a modification.

In a modification of the speed adjustment support device 1 according to the present embodiment, the adjustment rule storage unit 220, which is referred to by the exceedance information production unit 140, may be disposed on the fog computer 6 or the cloud server 7 as exemplarily illustrated in FIG. 9. With this configuration, the adjustment rule storage unit 220 does not need to be provided on the speed adjustment support device 1 and can be shared and used by a plurality of speed adjustment support devices 1, and thus efficient use of storage capacity and efficient maintenance of adjustment rules can be expected.

Figure 10:
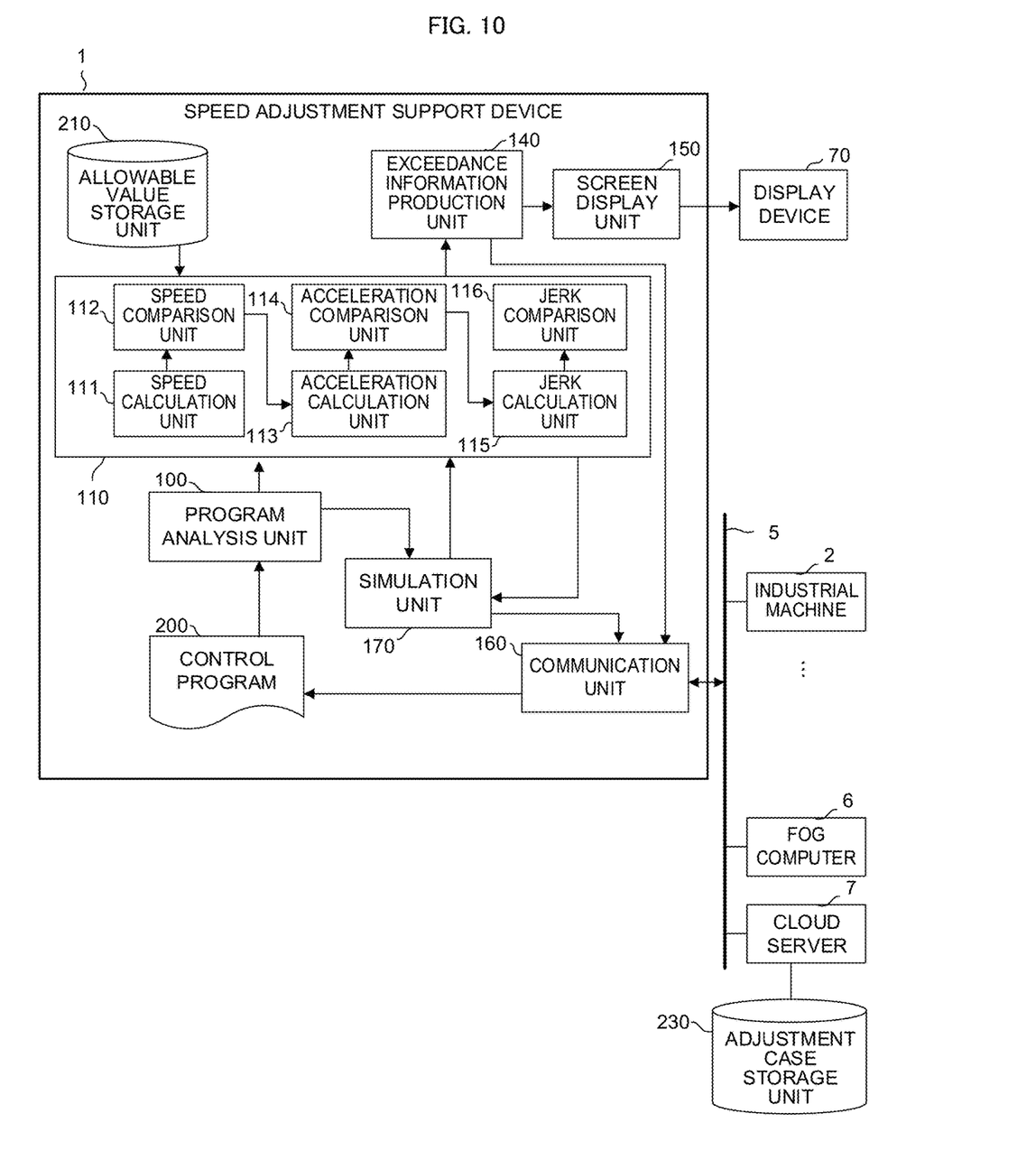
FIG. 10 is a schematic functional block diagram of a speed adjustment support device according to another modification.
Figure 11:
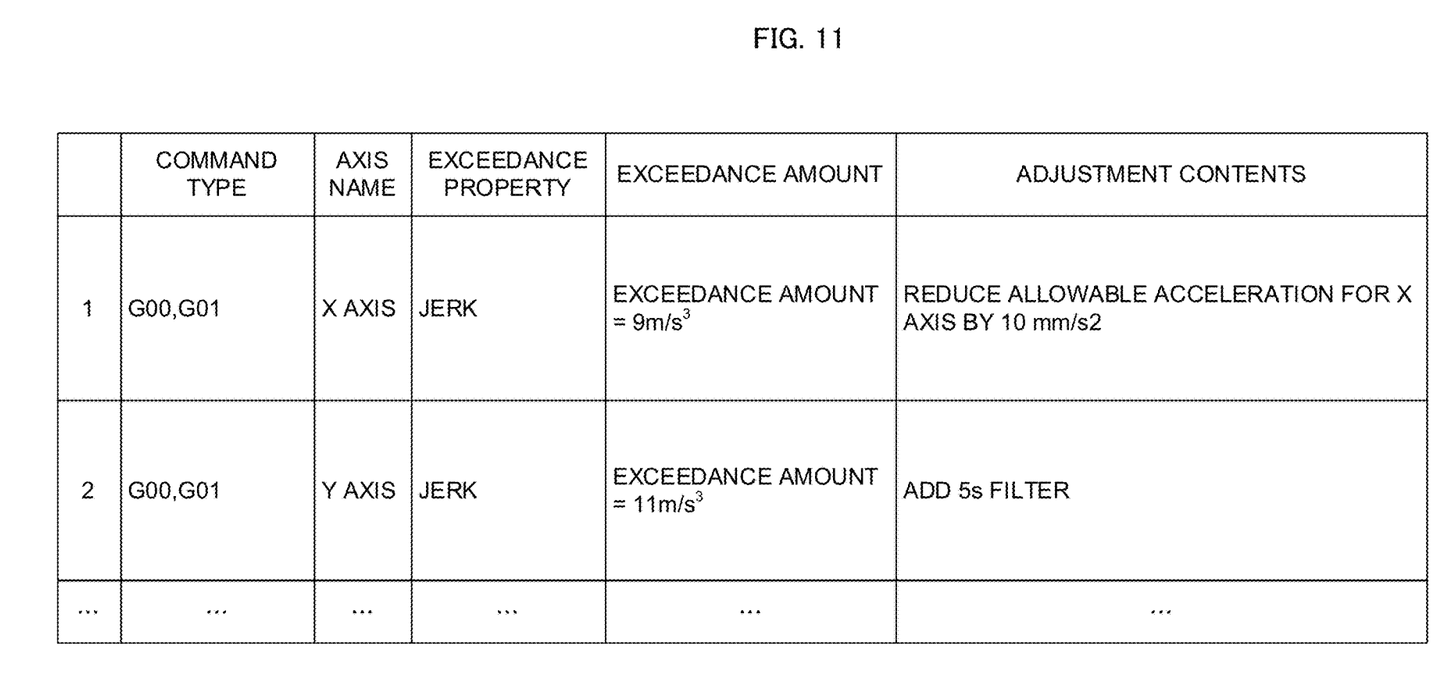
FIG. 11 is a diagram illustrating exemplary adjustment cases.

In another modification of the speed adjustment support device 1 according to the present embodiment, an adjustment case storage unit 230 storing past cases of speed adjustment of the industrial machine 2 may be provided on the fog computer 6 or the cloud server 7 as exemplarily illustrated in FIG. 10. In this case, the exceedance information production unit 140 refers to the adjustment case storage unit 230 in place of the adjustment rule storage unit 220. The adjustment case storage unit 230 stores a plurality of adjustment cases in each of which the contents of past parameter adjustment are associated with a command type, an exceedance axis name, an exceedance property (speed, acceleration, or jerk), and an exceedance amount, for example, as illustrated in FIG. 11. The adjustment cases may be produced based on information collected from industrial machines 2 through the network 5 as the contents of parameter adjustment that is actually performed at the industrial machines 2 and with which exceedance of the jerk or the like is improved as a result. The exceedance information production unit 140 searches for at least one adjustment case having a matching command type, a matching exceedance axis name, a matching exceedance property (speed, acceleration, or jerk), and a close exceedance amount and produces exceedance information including the contents of adjustment in the searched adjustment case as an improvement means. With this configuration, parameter adjustment related to speed control can be easily supported based on an actual past adjustment case.

Although the embodiments of the present invention are described above, the present invention is not limited to the above-described exemplary embodiments but may be performed in various aspects with appropriate changes.

The invention claimed is:

1. A speed adjustment support device configured to analyze a control program for controlling an industrial machine and support parameter adjustment so that a value related to speed falls within an allowable value range set in advance, the speed adjustment support device comprising:
a processor configured to
calculate a jerk of the industrial machine per unit time,
perform a comparison of the calculated jerk with an allowable jerk for each axis of the industrial machine stored in advance, and
in response to the calculated jerk exceeding the allowable jerk as a result of the comparison, produce exceedance information including at least an exceeding state of the jerk and improvement information, wherein the speed adjustment support device is configured to support work of adjusting a parameter related to speed of the industrial machine based on the exceedance information;
the speed adjustment support device further comprises an adjustment rule storage memory storing at least one adjustment rule in which an exceeding state of the jerk and an adjustment target parameter are associated with each other in advance;
the processor is configured to identify the adjustment target parameter as the improvement information based on the exceeding state of the jerk and said at least one adjustment rule stored in the adjustment rule storage memory;
the adjustment rule storage memory stores said at least one adjustment rule in which the adjustment target parameter is associated with a command type, an exceedance axis name, an exceedance property, and an exceedance amount; and
the processor is configured to
identify values of the command type, the exceedance axis name, the exceedance property, and the exceedance amount based on information on the result of the comparison,
search the adjustment rule storage memory for, among said at least one adjustment rule, an adjustment rule corresponding to the identified values of the command type, the exceedance axis name, the exceedance property, and the exceedance amount, and
produce the exceedance information including, as the improvement information, the adjustment target parameter included in the searched adjustment rule;
wherein the command type includes a single command or a sequence of two or more consecutive commands; and
wherein the processor is further configured to
calculate, at positions before and after a jerk exceedance point, an angle of a movement direction of a tool and a radius of curvature of the movement direction of the tool,
determine, based on a magnitude of the angle and the radius of curvature, whether the jerk exceedance point corresponds to a corner shape or an arc shape, and
in response to the jerk exceedance point corresponding to the corner shape or the arc shape, adjust at least one of a deceleration speed parameter or a maximum acceleration setting parameter.

2. The speed adjustment support device according to claim 1, wherein
the processor is configured to calculate the jerk per unit time based on a difference in acceleration for said each axis of the industrial machine between control cycles.

3. The speed adjustment support device according to claim 1, wherein
the processor is configured to, in response to the calculated jerk not exceeding the allowable jerk, output a signal to a control device, and
the control device is configured to control the industrial machine in accordance with the control program based on the signal received from the processor.

* * * * *